United States Patent
Autenrieth et al.

(10) Patent No.: US 6,355,589 B1
(45) Date of Patent: Mar. 12, 2002

(54) METHOD FOR PRETREATING A CATALYST MATERIAL

(75) Inventors: Rainer Autenrieth, Erbach; Stefan Brauchle, Biberach/Riss; Otto Kumberger, Mannheim, all of (DE)

(73) Assignees: Xcellsis GmbH, Kirchheim/Teck-Nabern; BASF Aktiengesellschaft, Ludwigshafen, both of (DE)

( * ) Notice: Subject to any disclaimer, the term of this patent is extended or adjusted under 35 U.S.C. 154(b) by 0 days.

(21) Appl. No.: 09/600,399

(22) PCT Filed: Dec. 19, 1998

(86) PCT No.: PCT/EP98/08338

§ 371 Date: Sep. 13, 2000

§ 102(e) Date: Sep. 13, 2000

(87) PCT Pub. No.: WO99/36350

PCT Pub. Date: Jul. 22, 1999

(30) Foreign Application Priority Data

Jan. 16, 1998 (DE) ......................................... 198 01 373

(51) Int. Cl.[7] ................................................ B01J 20/34

(52) U.S. Cl. .............................................. 502/38; 502/53
(58) Field of Search ...................................... 502/38, 53

(56) References Cited

U.S. PATENT DOCUMENTS 4,822,824 A * 4/1989 Iglesia et al. ................ 518/709

FOREIGN PATENT DOCUMENTS

| EP | 0192289 | * | 8/1986 | ............. C07C/2/00 |
| EP | 0601957 A1 | * | 6/1994 | ............. B01J/8/02 |
| JP | 58017836 | * | 2/1983 | ............. B01J/23/72 |
| JP | 63310703 | * | 12/1988 | ............. C01B/3/32 |
| JP | 09075734 | * | 3/1997 | ............. B01J/23/94 |

* cited by examiner

Primary Examiner—Steven P. Griffin
Assistant Examiner—Maribel Medina
(74) Attorney, Agent, or Firm—Crowell & Moring LLP

(57) ABSTRACT

A process for pretreating a catalyst material for catalysing a chemical reaction in a reactor, in particular for a reforming catalyst material for catalysing a methanol reforming reaction to obtain hydrogen, includes (1) subjecting the catalyst material to a hydrogen-containing gas mixture in a forming step, and (2) subsequently subjecting the catalyst material to an oxygen-containing gas mixture in a deactivating step.

5 Claims, No Drawings

METHOD FOR PRETREATING A CATALYST MATERIAL

BACKGROUND AND SUMMARY OF INVENTION

The invention relates to a process for pretreating a catalyst material for catalysing a chemical reaction in a corresponding reactor, for example a reforming catalyst material for catalysing a methanol reforming reaction to obtain hydrogen in a motor vehicle operated by fuel cells.

A known fact about most common reforming catalyst materials, specifically those based on Cu and/or Zn, is that they undergo a marked decrease in volume and mass both during the initial forming and during the first operating hours during subsequent reforming reaction operation. If the catalyst material is consequently introduced into the reforming reactor and formed there, i.e. activated in its catalytic effect, without pretreatment, to be available subsequently for catalysing the reforming reaction, the decrease in volume and mass leads to the reactor volume of the catalyst material no longer being fully utilized in the operation of the reforming reactor. A corresponding decrease in the specific activity of the catalyst material, and consequently in the performance of the reforming reactor, occurs. This effect reduces the actual conversion capacity of the reactor with respect to its rated conversion capacity. A further difficulty of this phenomenon arises specifically in the case of reforming reactors with a heat exchanger structure. In the case of such reactors, used for example for reforming water vapour from methanol in motor vehicles operated by fuel cells, a first reaction chamber of two reaction chambers in heat exchanging connection is provided with a reforming catalyst material, while the second reaction chamber serves as a heating chamber, in which heat is provided, for example by a combustion process. If a reduction in volume of the reforming catalyst material then occurs in the first reaction chamber, to this extent no endothermic reforming reaction occurs any longer, so that the heat dissipation from the second reaction motor vehicles operated by fuel cells, a first reaction chamber of two reaction chambers in heat exchanging connection is provided with a reforming catalyst material, while the second reaction chamber serves as a heating chamber, in which heat is provided, for example by a combustion process. If a reduction in volume of the reforming catalyst material- then occurs in the first reaction chamber, to this extent no endothermic reforming Reaction occurs any longer, so that the heat dissipation from the second reaction chamber is reduced. As a consequence of this, overheating effects can occur and may lead to the reactor being damaged or even failing.

In German patent application No. 197 25 006.8 there is a description of a process for treating a reforming catalyst material suitable for catalysing a methanol reforming reaction in which the said material is pre-aged before it is introduced into the reforming reactor, in that it is treated in a methanol-water atmosphere at temperatures between approximately 240° C. and approximately 350° C. and with a charge between approximately 0.5 $m^3H_2/h$ and approximately 50 $m^3H_2/h$ per litre of catalyst material.

In German patent application No. 197 25 009.2 there is a description of a process for pretreating a reforming catalyst material for catalysing a methanol reforming reaction in which the said material is pre-aged before it is introduced into the reforming reactor, in that it is baked in a dry atmosphere. If the catalyst material is in unreduced form, the baking may be performed in air for example. If, on the other hand, it is in reduced form as a result of prior application of a reducing reaction, the baking is performed in an inert atmosphere, for example a nitrogen or argon atmosphere. The baking is typically performed over several hours at temperatures of the order of 300° C. and more.

In laid-open patent application EP 0 192 289 A2 there is a description of a process for pretreating a crystalline silicate catalyst material after its production and before its use as a catalytically active substance, the pretreatment process comprising a two-step redox treatment in which the catalyst material is subjected in a first step for at least 15 minutes to a hydrogen-containing reducing gas at a temperature of between 350° C. and 700° C. and in a second step for at least 15 minutes to an oxygen-containing, oxidizing gas at a temperature of between 350° C. and 700° C. In the case of an $SiO_2/Ga_2O_3$ catalyst material, the redox treatment cycle is preferably carried out no more than three times if the molar ratio in the crystalline silicate is at least 110, and between three and ten times if the molar ratio lies between 110 and 130, while in the case of molar ratios of between 130 and 220 the silicate is previously subjected to a calcining treatment at a temperature of between 600° C. and 1000° C. and then the redox treatment cycle is performed between three and ten times. The reducing treatment preferably takes place with a hydrogen content of the reducing gas of at least 20% by volume, the oxidizing treatment preferably takes place with an oxygen concentration of at least 5% by volume.

In the case of a methanol reforming reactor disclosed in laid-open patent application JP 63-310703 (A), measures are taken to maintain a dense packing of the catalyst charge introduced, in spite of the initial decrease in its volume and mass. For this purpose, after it has been introduced into the reforming reactor and before the reforming reaction operation begins, the catalyst material is subjected to a necessary reducing reaction, which leads to the decrease in volume of the catalyst material. A movable cover plate loaded by a compression spring keeps the catalyst material compressed as a densely packed charge.

The invention is based on the technical problem of providing a process for pretreating a catalyst material in such a way that, by use of the catalyst material pretreated in this way in a corresponding reactor, a marked decrease in the reactor conversion rate does not also occur in the first operating hours of the reaction operation and, in the case of the reactor mentioned above with a heat exchanger structure, harmful overheating effects are avoided.

DETAILED DESCRIPTION OF THE INVENTION

The invention solves this problem by providing a process in wich the catalyst material is pretreated before it is introduced into the reactor in that firstly, in a forming step, it is repeatedly subjected to a hydrogen-containing forming gas and then, in a subsequent deactivating step, it is subjected to an oxygen-containing deactivating gas. By this process, with the cycle of the forming step and the subsequent deactivating step performed repeatedly, by far the greatest part of any reduction in volume and/or mass of the catalyst material already takes place in the pretreatment phase. The catalyst material pretreated in this way then does not show any marked decrease in volume and mass after it is introduced into the reactor, even in the first operating hours of the reactor operation. The reaction chamber of the reactor consequently remains largely fully utilized over the entire duration of reactor operation, so that the reactor does not show any significant decrease in its performance. Filling of catalyst material during reactor operation is therefore usually not necessary. Since the reaction chamber of the reactor remains fully utilized by the catalyst material, in the case of a reactor with a heat exchanger structure there is no risk of overheating of the heating region on account of a reduced heat demand of an endothermic reaction. Since the catalyst material pretreated according to the invention no longer shows any marked reduction in volume in subsequent reactor operation, in the case where the catalyst material is introduced into the reactor as a catalyst bed there is moreover no risk of this catalyst bed spalling on account of the effects of shrinkage.

In a process developed according to another embodiment of the present invention, in the forming step an inert gas/hydrogen mixture with a hydrogen content of at most approximately 10% is used as the forming gas.

In a process developed according to another embodiment of the present invention, in the deactivating step an inert gas/oxygen mixture with an oxygen content of at most approximately 10% is used as the deactivating gas.

With respect to the process temperatures, it is found that a temperature of, for example, between approximately 100° C. and approximately 500° C. is favourable for the forming step, and a temperature of between approximately 0° C. and approximately 500° C. is favourable for the deactivating step.

As an exemplary embodiment of the invention, representative of numerous further possible ways of realizing the invention, let us consider a customary $Cu/ZnO/Al_2O_3$ catalyst material for catalysing a methanol reforming reaction in which the Cu/ZnO material forms the catalytically active constituent. Such a material is suitable, for example, for the water vapour reforming of methanol, as used in a motor vehicle operated by fuel cells, in order to obtain the hydrogen needed for the fuel cells from methanol carried on the vehicle in liquid form. The catalyst material is usually provided in the form of pellets and is introduced into the reforming reaction chamber of the reactor as a charge. To prevent a marked decrease in the performance of the reactor, i.e. its reforming reaction conversion, in the first hours of reforming reaction operation, the catalyst material is subjected to the following pretreatment before it is introduced into the reaction chamber of the reactor.

The pretreatment comprises a number of cycles of two steps in each case, to be specific a forming step and a subsequent deactivating step. In the forming step, the catalyst material is subjected to an inert gas/hydrogen mixture at a temperature of between approximately 100° C. and approximately 500° C., the hydrogen acting as the forming gas being contained in the gas mixture in a proportion of up to approximately 10%. After the forming has taken place in this way, the catalyst material is subjected in the deactivating step to an inert gas/oxygen mixture at a temperature of between approximately 0° C. and approximately 500° C., the oxygen acting as the deactivating gas being contained in the gas mixture in a proportion of up to approximately 10%. The pretreatment cycle, comprising the forming step and the subsequent deactivating step, is performed once or repeatedly, until no appreciable reduction in volume and mass of the catalyst material occurs any longer. It is found that, by this pretreatment, the reduction in volume and mass of the catalyst material before it is introduced into the reforming reactor can to the greatest extent be anticipated.

After introducing the catalyst material pretreated or pre-aged in this way into a corresponding methanol reforming reactor, it consequently shows no appreciable reduction in volume and mass in a subsequent reforming reaction operation. As a result, the reaction chamber of the reactor is fully utilized by the catalyst material over a long duration of reactor operation, without catalyst material having to be replenished. Furthermore, the catalyst material pretreated in such a way is also well suited for applying as a bed, for example on the wall of a reaction chamber of the reactor. This is so since the pretreatment of the catalyst material has the effect that the catalyst bed applied no longer shows any appreciable reduction in volume in subsequent reforming reaction operation and therefore does not tend to spall, as can occur in the case of catalyst material not pretreated in this way.

Use of the catalyst material pretreated according to the invention is also advantageous in particular in reforming reactors in which an endothermic reforming reaction takes place and which have a heat exchanger structure in which the reforming reaction chamber is in thermal contact with a heating chamber, which provides heat for example by means of a combustion process and is suitably designed for this purpose, in that it has for example a corresponding catalytic bed or charge and/or structure. This is so because the fact that the pre-aged reforming catalyst material no longer shows any marked reduction in volume at the beginning of reforming reaction operation has the effect that in the reaction chamber there is also not created any region in which an endothermic catalytic reforming reaction can no longer take place. The heat provided in the heating chamber is consequently used over a long duration of reactor operation in the entire reforming reaction chamber for the endothermic reforming reaction without the creation of regions in which the heat provided by the heating chamber is no longer dissipated and could lead to overheating effects. Consequently, when the catalyst material pretreated according to the invention is used, there is no need to fear damage to or even failure of the reactor on account of such overheating.

The invention can be beneficially used not only for the methanol reforming catalyst material described but for all types of catalyst materials which show a reduction in volume or mass at the beginning of reaction operation, which can be anticipated to the greatest extent by a number of pretreatment cycles, comprising a forming step and subsequent deactivating steo, before the catalyst material is introduced into the corresponding reactor. The invention can be used in particular for various reforming catalyst materials in the chemical industry.

What is claimed is:

1. A process for pretreating a catalyst material that is subject to a reduction in volume during initial use for catalyzing a chemical reaction, said process comprising:

before introducing the catalyst material to a reactor, repeatedly subjecting the catalyst to a treatment comprising an activating step and a subsequent deactivating step, thereby reducing the volume of the catalyst, wherein the activating step comprises contacting the catalyst material with a hydrogen-containing gas mixture; and wherein the deactivating step comprises contacting the catalyst material with an oxygen-containing gas mixture.

2. A process according to claim 1, wherein the hydrogen-containing gas mixture comprises an inert gas/hydrogen mixture having a hydrogen content of at most approximately 10%.

3. A process according to claim 1, wherein the oxygen-containing gas mixture comprises an inert gas/oxygen mixture having an oxygen content of at most approximately 10%.

4. A process according to claim 1, wherein the activating step is carried out at a temperature between approximately 100° C. and approximately 500° C.

5. A process according to claim 1, wherein the deactivating step is carried out at a temperature between approximately 0° C. and approximately 500° C.

* * * * *